United States Patent
Hung (10) Patent No.: US 10,725,852 B2
(45) Date of Patent: Jul. 28, 2020

(54) COMPUTER AND AUTOMATIC PROTECTION METHOD THEREOF

(71) Applicant: QUANTA COMPUTER INC., Taoyuan (TW)

(72) Inventor: Li-Te Hung, Taoyuan (TW)

(73) Assignee: QUANTA COMPUTER INC. (TW)

( * ) Notice: Subject to any disclaimer, the term of this patent is extended or adjusted under 35 U.S.C. 154(b) by 64 days.

(21) Appl. No.: 16/265,058

(22) Filed: Feb. 1, 2019

(65) Prior Publication Data

US 2020/0081764 A1    Mar. 12, 2020

(30) Foreign Application Priority Data

Sep. 11, 2018    (TW) .............................. 107131924 A (51) Int. Cl.

| | |
|---|---|
| G06F 11/07 | (2006.01) |
| G06F 21/60 | (2013.01) |
| G01N 29/44 | (2006.01) |
| G10L 17/00 | (2013.01) |
| G10L 25/51 | (2013.01) |
| G10L 17/06 | (2013.01) |
| G01N 29/50 | (2006.01) |

(52) U.S. Cl.
CPC ..... *G06F 11/0793* (2013.01); *G01N 29/4436* (2013.01); *G01N 29/50* (2013.01); *G06F 11/0751* (2013.01); *G06F 21/60* (2013.01); *G10L 17/005* (2013.01); *G10L 17/06* (2013.01); *G10L 25/51* (2013.01); *G01N 2291/02881* (2013.01)

(58) Field of Classification Search
CPC .. G06F 11/0793; G06F 11/0751; G06F 21/60; G01N 29/4436; G01N 29/50; G10L 17/005; G10L 17/06; G10L 25/51
See application file for complete search history.

(56) References Cited

U.S. PATENT DOCUMENTS

| | | | | |
|---|---|---|---|---|
| 8,060,761 | B2 * | 11/2011 | Lai ........................ | G06F 1/3206 |
| | | | | 713/300 |
| 8,984,338 | B2 * | 3/2015 | Cho ........................ | H04L 12/12 |
| | | | | 714/30 |

(Continued)

FOREIGN PATENT DOCUMENTS

| | | |
|---|---|---|
| CN | 102734194 A | 10/2012 |
| CN | 102737480 A | 10/2012 |
| CN | 204206222 A | 3/2015 |

*Primary Examiner* — Matthew M Kim
*Assistant Examiner* — Indranil Chowdhury
(74) *Attorney, Agent, or Firm* — Innovation Counsel LLP (57) ABSTRACT

A computer and an automatic protection method thereof are provided. The automatic protection method includes the following steps. A sound receiving unit of the computer receives a sound signal. Whether a fan error event occurs is determined according to the sound signal. If the fan error event occurs, then a first data protection procedure is performed. Whether a disaster event occurs is determined according to the sound signal. If the disaster event occurs, then a second data protection procedure is performed. Whether the computer is at a locking status is determined. If the computer is at the locking status, then whether an information security hazard event occurs is determined according to the sound signal. If the information security hazard event occurs, then a third data protection procedure is performed.

11 Claims, 4 Drawing Sheets

(56) References Cited

U.S. PATENT DOCUMENTS

| | | | |
|---|---|---|---|
| 10,552,249 B1* | 2/2020 | Johansson | G06F 11/0751 |
| 2011/0054845 A1* | 3/2011 | Han | H04L 12/2825 |
| | | | 702/185 |
| 2011/0054967 A1* | 3/2011 | Han | G06Q 10/06311 |
| | | | 705/7.13 |
| 2018/0158288 A1* | 6/2018 | Logan | G01S 19/51 |
| 2019/0113956 A1* | 4/2019 | Hung | G06F 1/3206 |

* cited by examiner

COMPUTER AND AUTOMATIC PROTECTION METHOD THEREOF

This application claims the benefit of Taiwan application Serial No. 107131924, filed Sep. 11, 2018, the subject matter of which is incorporated herein by reference.

BACKGROUND OF THE INVENTION

Field of the Invention

The invention relates to an electronic device and a control method thereof, and more particularly to a computer and an automatic protection method thereof.

Description of the Related Art

With the development of computer technology, various computers are continuously innovated. Users can use the computers to work or store some information. More particularly, in the trend of digital information, almost all kinds of information on work and life can be stored in the computer in a digital manner.

However, when the situation occurs, such as the unexpected disaster, overheating, the stealing/destroying from interested parties or the like, important or private information within the computer may be damaged or stolen. Thus, how to provide an automatic protection method for a computer to prevent data corruption or steal has become an important direction for researchers to study.

SUMMARY OF THE INVENTION

The invention relates to a computer and an automatic protection method thereof, which determine a fan error event, a disaster event, or an information security hazard event according to a sound signal to prevent data corruption or steal.

According to a first aspect of the invention, an automatic protection method of a computer is provided. The automatic protection method of the computer includes the following steps. A sound signal is received by a sound receiving unit of the computer. Whether a fan error event occurs is determined according to the sound signal. If the fan error event occurs, then a first data protection procedure is performed. Whether a disaster event occurs is determined according to the sound signal. If the disaster event occurs, then a second data protection procedure is performed. Whether the computer is at a locking status is determined. If the computer is at the locking status, then whether an information security hazard event occurs is determined according to the sound signal. If the information security hazard event occurs, then a third data protection procedure is performed.

According to a second aspect of the invention, a computer is provided. The computer includes a sound receiving unit, a fan, a fan determination unit, a processing unit, a disaster determination unit, a status determination unit and a data security determination unit. The sound receiving unit receives a sound signal. The fan determination unit determines whether a fan error event occurs according to the sound signal. If the fan error event occurs, then the processing unit performs a first data protection procedure. The disaster determination unit determines whether a disaster event occurs according to the sound signal. If the disaster event occurs, the processing unit performs a second data protection procedure. The status determination unit determines whether the computer is at a locking status. If the computer is at the locking status, then the data security determination unit determines whether an information security hazard event occurs according to the sound signal. If the information security hazard event occurs, then the processing unit performs a third data protection procedure.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
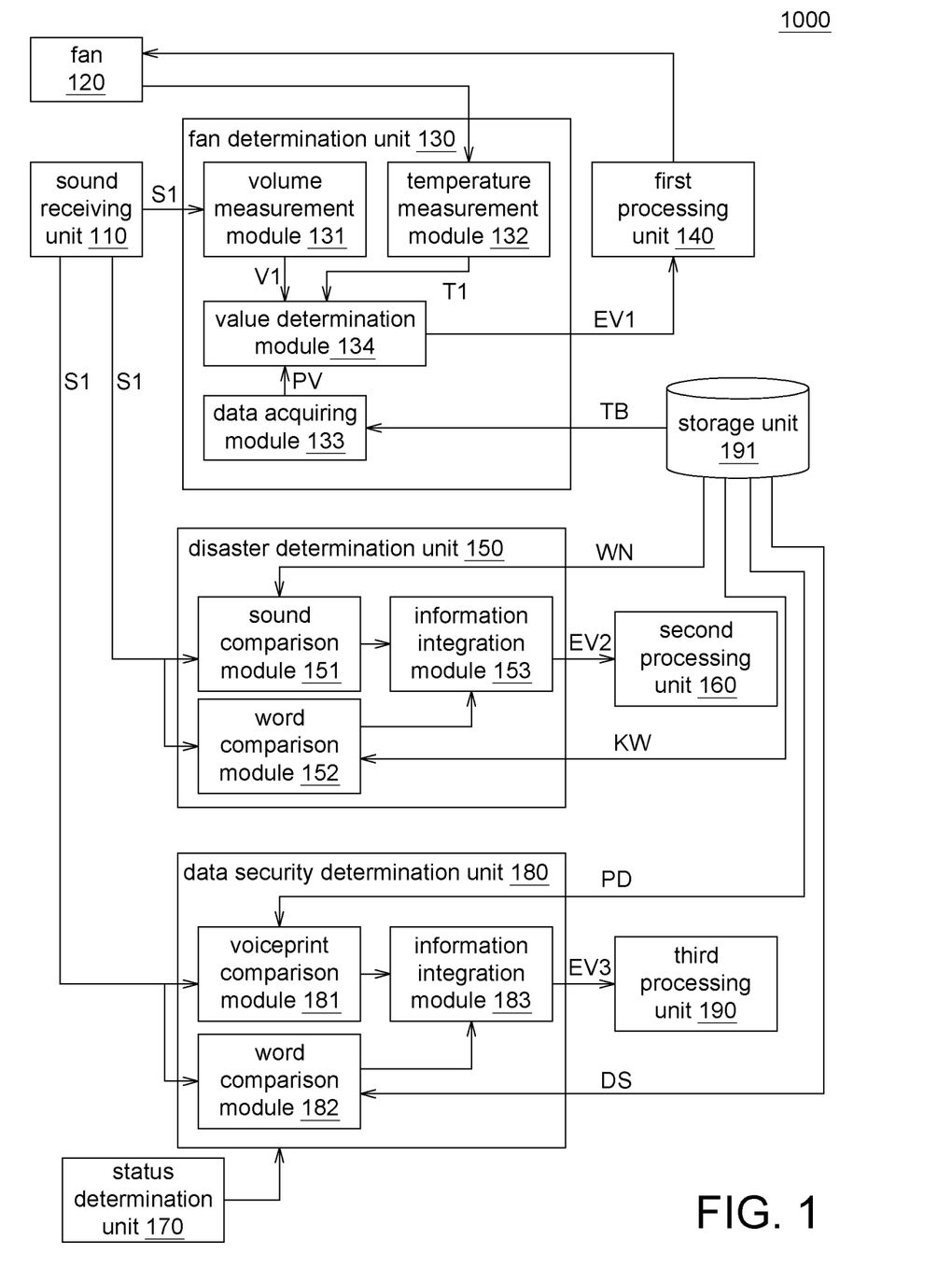
FIG. 1 is a schematic view showing a computer according to an embodiment of the invention.

FIG. 1 is a schematic view showing a computer 1000 according to an embodiment of the invention. Referring to FIG. 1, the computer 1000 is, for example, a laptop computer, a desktop computer, an all-in-one computer or a tablet computer. The computer 1000 includes a sound receiving unit 110, a fan 120, a fan determination unit 130, a first processing unit 140, a disaster determination unit 150, a second processing unit 160, a status determination unit 170, a data security determination unit 180, a third processing unit 190 and a storage unit 191. The sound receiving unit 110 is, for example, a microphone. The fan determination unit 130, the first processing unit 140, the disaster determination unit 150, the second processing unit 160, the status determination unit 170, the data security determination unit 180 and the third processing unit 190 are, for example, a circuit, a chip, a circuit board, a program module, a storage device storing several sets of program codes or a combination of a sensor and a circuit. The fan determination unit 130, the first processing unit 140, the disaster determination unit 150, the second processing unit 160, the status determination unit 170, the data security determination unit 180 and the third processing unit 190 may be respectively independent components, or parts of components can also be integrated into a single assembly. For example, the first processing unit 140, the second processing unit 160 and the third processing unit 190 can be integrated into a single processing chip. Alternatively, internal components of the fan determination unit 130, the disaster determination unit 150, the status determination unit 170, and the data security determination unit 180 can be shared with one another.

The computer 1000 in this embodiment can determine whether the computer 1000 is at a fan error event EV1, a disaster event EV2, or an information security hazard event EV3 through the fan determination unit 130, the disaster determination unit 150, the status determination unit 170, and the data security determination unit 180, and then a data protection procedure is performed on the computer 1000 through the first processing unit 140, the second processing unit 160 and the third processing unit 190 to ensure the data security.

In this embodiment, the fan determination unit 130, the disaster determination unit 150 and the data security determination unit 180 perform the determination mainly according to a sound signal S1 received by the sound receiving unit 110, and determine whether the fan error event EV1, the disaster event EV2, or the information security hazard event EV3 occurs.

Figure 2:
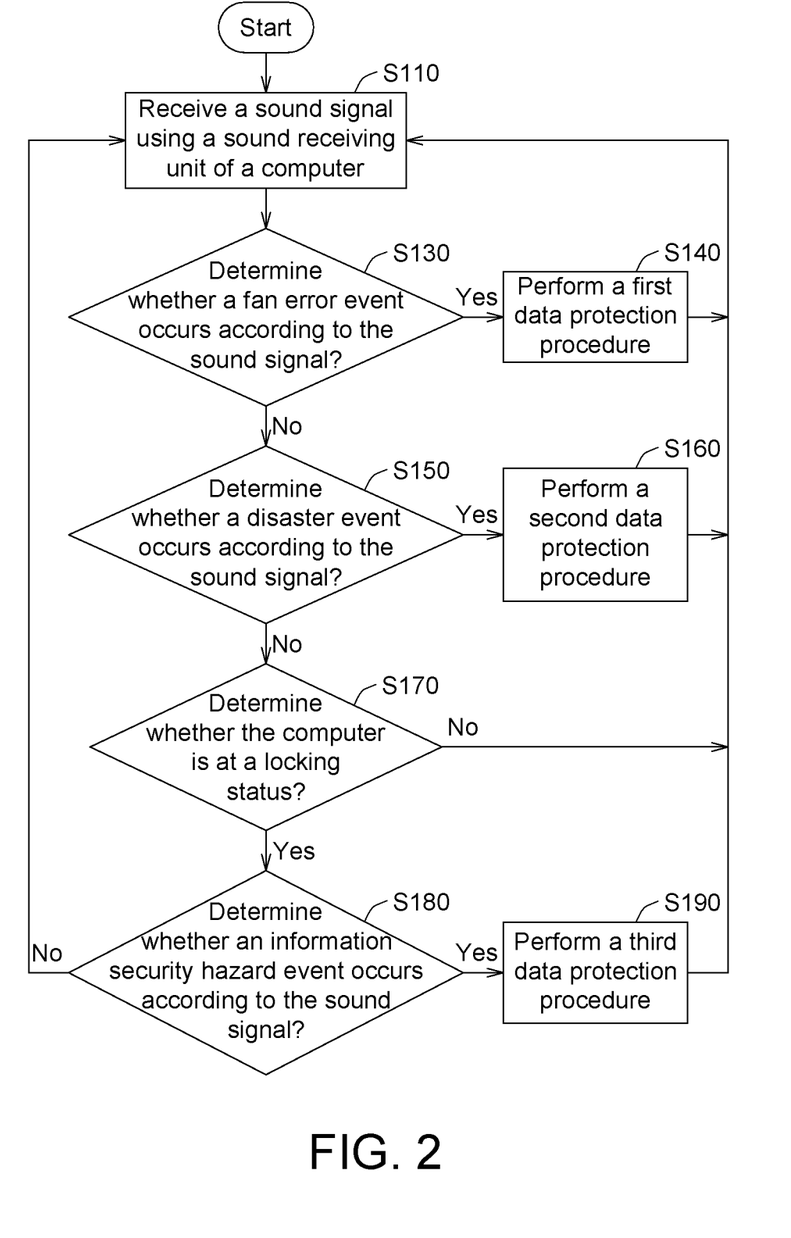
FIG. 2 is a flow chart showing an automatic protection method of a computer according to an embodiment of the invention.

The operation of each element will be further described with reference to a flow chart. FIG. 2 is a flow chart showing an automatic protection method of the computer 1000 according to an embodiment of the invention. Referring to FIG. 2, in a step S110, the sound receiving unit 110 of the computer 1000 receives the sound signal S1. In an embodiment, the hardware upgrade for the digital assistant can be equipped, and the sound receiving unit 110 is directly connected to the Platform Controller Hub (PCH) using the PCH technology. This method has the power-saving advantage, the chip area can be significantly reduced, the design of the peripheral circuit can be simplified, and the sizes of modules and system's peripheral components can be reduced.

In addition, the sound receiving unit 110 can also use the dual-microphone noise-reduction technology supported by an anti-noise microphone to effectively filter environmental noise and clearly receive the sound.

Furthermore, the sound receiving unit 110 can have built-in elements required by a smart speaker (e.g., equipped with the configuration including a speaker, a noise-reduction microphone or a four-array pointing microphone), and can have the directional sound receiving ability in the noisy environment.

Figure 3:
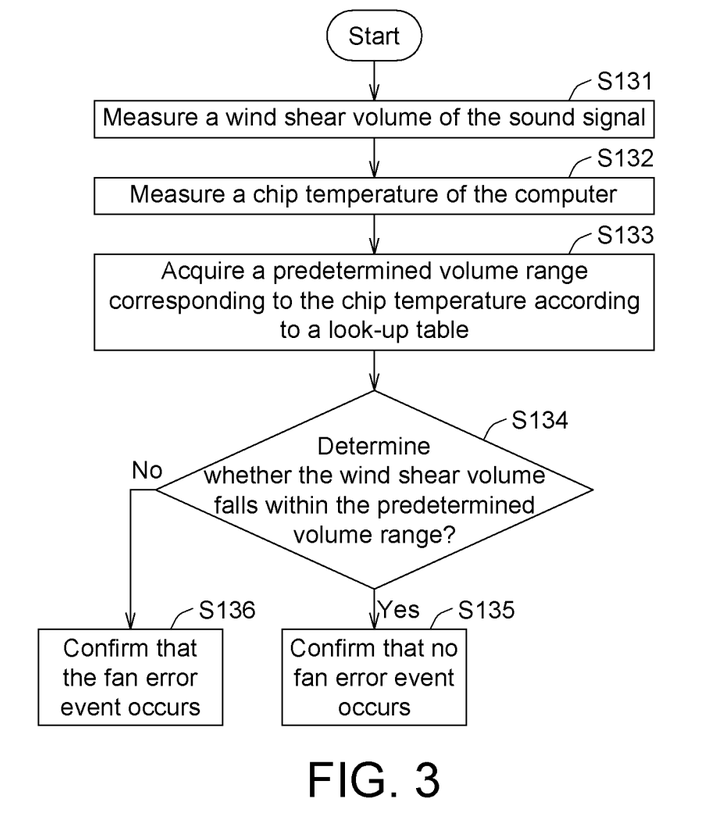
FIG. 3 is a detailed flow chart showing a step S130 in FIG. 2.

Next, in a step S130, the fan determination unit 130 determines whether a fan error event EV1 occurs according to the sound signal S1. FIG. 3 is a detailed flow chart showing a step S130 in FIG. 2. Referring to FIGS. 1 and 3, the fan determination unit 130 includes a volume measurement module 131, a temperature measurement module 132, a data acquiring module 133 and a value determination module 134. The volume measurement module 131 is, for example, an analog decibel meter, a digital decibel meter or an acoustic wave sensor. The temperature measurement module 132 is, for example, a contact temperature sensor or an infrared temperature sensor. The data acquiring module 133, such as a data access circuit, a data bus or a data transmission cable, is to be connected to the storage unit 191 and acquires data. The value determination module 134 is, for example, a processing circuit or a calculus program module.

As shown in FIG. 3, the step S130 includes steps S131 to S136. The steps S131 and S132 are exchangeable, and are not limited to the order in FIG. 3. In the step S131, the volume measurement module 131 measures a wind shear volume V1 of the sound signal S1. The volume measurement module 131 can filter out the noise and the human voice in the sound signal S1 through the filter, and only retains the wind shear sound to obtain the wind shear volume V1.

In the step S132, the temperature measurement module 132 measures a chip temperature T1 of the computer 1000. In an embodiment, the temperature measurement module 132 performs the measurement on the chip of the central processing unit to ensure that the operational core of the computer 1000 does not encounter overheating.

In the step S133, the data acquiring module 133 acquires a look-up table TB from the storage unit 191, and acquires a predetermined volume range PV corresponding to the chip temperature T1 according to the look-up table TB.

In practice, the computer 1000 can determine a rotating speed of the fan according to the chip temperature T1. That is, when the chip temperature T1 is relatively high, the rotating speed of the fan is increased to speed up the heat dissipation, and the wind shear volume corresponding to the higher rotating speed is generated. When the chip temperature T1 is relatively low, the rotating speed of the fan is decreased to save the electrical energy, and the wind shear volume corresponding to the lower rotating speed is generated. Thus, the wind shear volume of the fan 120 and the chip temperature T1 have a corresponding relationship (i.e., the above-mentioned look-up table TB), and the look-up table TB can be stored in the storage unit 191 in advance.

For example, when the chip temperature T1 is 65 degrees, the wind shear volume V1 corresponding to the rotating speed of the fan should be 34 decibels, and when the chip temperature T1 is 75 degrees, the wind shear volume V1 corresponding to the rotating speed of the fan should be 39 decibels.

In an embodiment, the look-up table TB records the relationship between the chip temperature T1 and the predetermined volume range PV after experiments are performed on several hundreds of normally operating computers.

In the step S134, the value determination module 134 determines whether the wind shear volume V1 falls within the predetermined volume range PV. If the wind shear volume V1 falls within the predetermined volume range PV, then the step S135 is performed. If the wind shear volume V1 does not fall within the predetermined volume range PV, then the step S136 is performed. In a specific embodiment, if the difference between the wind shear volume V1 and the predetermined volume range PV is within 5 decibels, then it is determined that the wind shear volume V1 falls within the predetermined volume range PV. If the difference between the wind shear volume V1 and the predetermined volume range PV is greater than 5 decibels, then it is determined that the wind shear volume V1 does not fall within the predetermined volume range PV.

In the step S135, because the wind shear volume V1 falls within the predetermined volume range PV, the value determination module 134 confirms that the fan error event EV1 does not occur. For example, when the chip temperature T1 is 65 degrees, the wind shear volume V1 corresponding to the rotating speed of the fan of the look-up table TB should be 34 decibels. At this time, if the wind shear volume V1 is 32 decibels, because the difference is smaller than 5 decibels, it confirms that the fan error event EV1 does not occur.

In the step S136, because the wind shear volume V1 does not fall within the predetermined volume range PV, the value determination module 134 confirms that the fan error event EV1 occurs. The fan error event EV1 is further transmitted to the first processing unit 140 by the value determination module 134. For example, when the chip temperature T1 is 75 degrees, the wind shear volume V1 corresponding to the rotating speed of the fan of the look-up table TB should be 39 decibels. At this time, if the wind shear volume V1 is 49 decibels, then it is confirmed that the fan error event EV1 occurs because the difference is greater than 5 decibels.

As shown in FIG. 2, in the step S130, if the fan determination unit 130 determines that the fan error event EV1 occurs, then the process goes to the step S140. In the step S140, the first processing unit 140 performs a first data protection procedure. The first data protection procedure includes, for example, uploading data to a cloud, backing up data into a hard drive, or outputting a reminder message on the screen or to the speaker device.

For the fan error event EV1, in addition the above-mentioned wind shear volume V1, the fan error event EV1 may also occur when the fan 120 is blocked by an object, or absorbs a large amount of dust to affect the heat transfer performance and increase the power consumption. This may shorten the lifetime of the fan 120 or even that of the computer 1000. In this embodiment, uploading data to the cloud, backing up data into the hard drive or outputting the reminder message to actively notify and remind the user can be performed through the above-mentioned method. The user can carry the computer 1000 to the maintenance center for further inspecting and repairing as soon as possible after the data backup is completed.

In a specific embodiment, the fan determination unit 130 is used to determine whether the conventional hard drive generates the abnormal sound. When the conventional hard drive is used for a long time longer than the rated year of use and if the abnormal sound generated when the hard drive operates abnormally, it represents that the hard drive may fail. Thus, the fan determination unit 130 can determine whether the sound signal S1 pertains to the sound generated when the hard drive operates abnormally, and thus perform the operation, such as uploading data from the hard drive to the cloud, backing up the hard drive data into the hard drive, or outputting the reminder message to actively notify and remind the user. The user can carry the computer 1000 to the maintenance center for further inspecting and repairing the hard drive as soon as possible after the data backup of the hard drive is completed.

Figure 4:
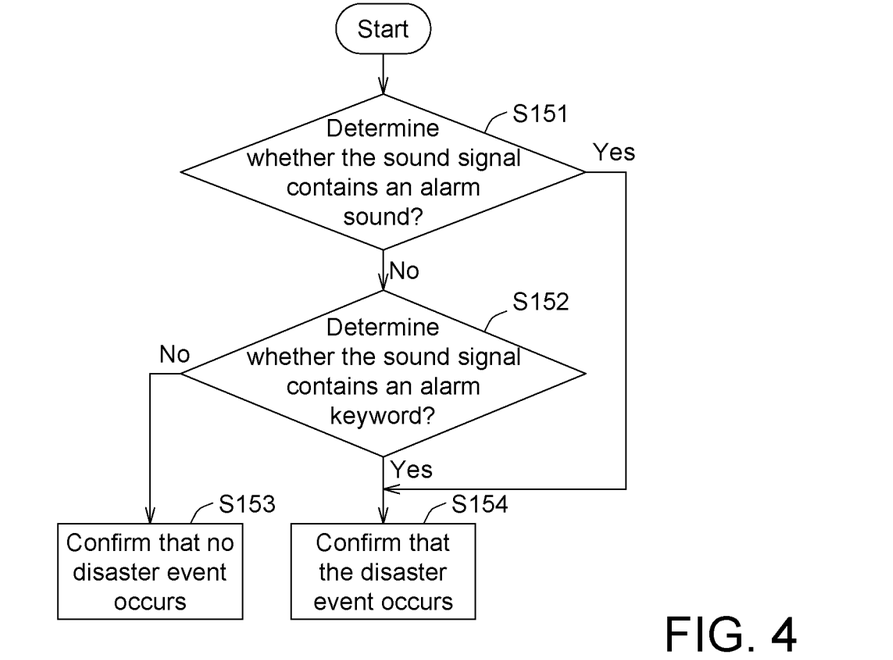
FIG. 4 is a detailed flow chart showing a step S150 in FIG. 2.

Next, in the step S150, the disaster determination unit 150 determines whether a disaster event EV2 occurs according to the sound signal S1. FIG. 4 is a detailed flow chart showing the step S150 in FIG. 2. Referring to FIGS. 1 and 4, the disaster determination unit 150 includes a sound comparison module 151, a word comparison module 152 and an information integration module 153. The sound comparison module 151 is, for example, a voiceprint comparison chip, a voiceprint comparison circuit or a voiceprint comparison program. The word comparison module 152 is, for example, a combination of an audio-to-text circuit and a text comparison circuit, or a combination of an audio-to-text program and a text comparison program. The information integration module 153 is, for example, a processing circuit or an artificial intelligence calculus program.

As shown in FIG. 4, the step S150 includes steps S151 to S154. The steps S151 and S152 are exchangeable, and are not limited to the order in FIG. 4. In the step S151, the sound comparison module 151 determines whether the sound signal S1 contains an alarm sound WN by way of comparison. The alarm sound is, for example, the alarm sound of the fire truck, the building alarm bell, or the earthquake alarm sound of the mobile phone. If the sound signal S1 contains the alarm sound WN, then the process goes to the step S154; and if the sound signal S1 does not contain the alarm sound WN, then the process goes to the step S152.

In the step S152, the word comparison module 152 determines, by way of comparison, whether the sound signal S1 contains an alarm keyword KW, such as "fire," "leave soon," or "earthquake." If the sound signal S1 contains the alarm keyword KW, then the process goes to the step S154; and if the sound signal S1 does not contain the alarm keyword KW, then the process goes to the step S153.

In a specific embodiment, the alarm sound WN and the alarm keyword KW can be stored in the storage unit 191 in advance and can be acquired through the sound comparison module 151 and the word comparison module 152 for comparison.

In the step S153, the sound signal S1 does not contain the alarm sound WN and the alarm keyword KW, so the information integration module 153 confirms that the disaster event EV2 does not occur.

In the step S154, the sound signal S1 contains the alarm sound WN or the alarm keyword KW, so the information integration module 153 confirms that the disaster event EV2 occurs. The information integration module 153 further transmits the disaster event EV2 to the second processing unit 160.

In a specific embodiment, the sound comparison module 151 and the word comparison module 152 can be integrated into a single element, which performs the above-mentioned comparison processes, so that the information integration module 153 can be omitted.

As shown in FIG. 2, in the step S150, if the disaster determination unit 150 determines that the disaster event EV2 occurs, then the process goes to the step S160. In the step S160, the second processing unit 160 performs a second data protection procedure. The second data protection procedure includes, for example, uploading data to the cloud or outputting the reminder message, such as the audio alarm, to switch the LED light from the static lighting with the constant brightness to the warning lighting with the frequency, through the backlight blinking of the screen, or the like.

For the disaster event EV2, the computer 1000 can speculate that a fire may occur nearby. In the event of a disaster, the frightened people need not to spend additional time to wait for uploading to save the backup data, and they can escape quickly at the first time. The transmission and protection works of the data in this embodiment can be quickly and instantaneously completed.

Then, in the step S170, the status determination unit 170 determines whether the computer 1000 is at a locking status. The locking status includes, for example, a dormant status, a sleep status or a standby status. If the computer 1000 is at the locking status, then the process goes to the step S180; and if the computer 1000 is not at the locking status, then it represents that the computer 1000 is at the used status, and there is no risk of data loss, so the process returns to the step S110. The status determination unit 170 determines, for example, the present power-consumptive status of the computer 1000 through the power management system. Alternatively, the computer 1000 may also actively output a message to the status determination unit 170.

Figure 5:
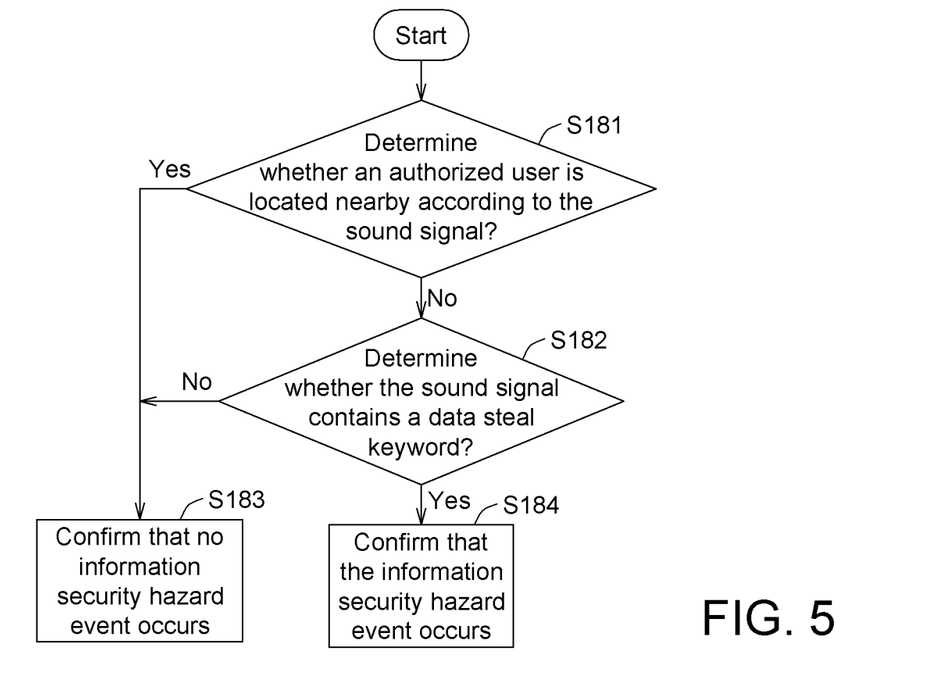
FIG. 5 is a detailed flow chart showing a step S180 in FIG. 2.

In the step S180, because the computer 1000 is at the locking status, the data security determination unit 180 determines whether an information security hazard event EV3 occurs. FIG. 5 is a detailed flow chart showing a step S180 in FIG. 2. Referring to FIGS. 1 and 5, the data security determination unit 180 includes a voiceprint comparison module 181, a word comparison module 182 and an information integration module 183. The voiceprint comparison module 181 is, for example, a voiceprint comparison chip, a voiceprint comparison circuit or a voiceprint comparison program. The word comparison module 182 is, for example, a combination of an audio-to-text circuit and a text comparison circuit, or a combination of an audio-to-text program and a text comparison program. The information integration module 183 is, for example, a processing circuit or an artificial intelligence calculus program.

As shown in FIG. 5, the step S180 includes steps S181 to S184. The steps S181 and S182 are exchangeable, and are not limited to the order in FIG. 5. In the step S181, the voiceprint comparison module 181 determines whether an authorized user (e.g., the owner of the computer 1000) is located nearby according to the sound signal S1. If the authorized user is located nearby, then it represents that the computer 1000 or data is not at risk of getting lost or stolen, and the process goes to the step S183 at this time. Correspondingly, if the authorized user is not located nearby, then it represents that the computer 1000 or data is at risk of getting lost or stolen, and the process goes to the step S182.

For example, the voiceprint comparison module 181 obtains identification data PD (e.g., the user's voiceprint, the sound password) of authorized user stored in advance from the storage unit 191 to perform the above-mentioned determination.

In the step S182, the word comparison module 182 determines whether the sound signal S1 contains a data steal keyword DS to further determine the risk of making the data be stolen. The data steal keyword DS includes, for example, "Trojan horse program," "copy program," "guess password," and so on. If the sound signal S1 does not contain the data steal keyword DS, then the process goes to the step S183; and if the sound signal S1 contains the data steal keyword DS, then the process goes to the step S184. Similarly, the data steal keyword DS can be stored in the storage unit 191 in advance, and can be acquired through the word comparison module 182 to perform the above-mentioned determination.

In the step S183, the authorized user is located nearby, or the sound signal S1 does not contain the data steal keyword DS, so the information integration module 183 confirms that the information security hazard event EV3 does not occur.

In the step S184, the authorized user is not located nearby and the sound signal S1 contains the data steal keyword DS, so the information integration module 183 confirms that an information security hazard event EV3 occurs. The information integration module 183 further transmits the information security hazard event EV3 to the third processing unit 190.

In a specific embodiment, the voiceprint comparison module 181 and the word comparison module 182 can be integrated into a single element, which performs the above-mentioned comparison action, so that the information integration module 183 can be omitted.

As shown in FIG. 2, in the step S180, if the data security determination unit 180 determines that the information security hazard event EV3 occurs, then the process goes to the step S190. In the step S190, the third processing unit 190 performs a third data protection procedure. The third data protection procedure includes, for example, shutting down the computer, disabling a function of an input/output apparatus, starting the image acquisition device to take photos and upload the acquired data to the cloud, sending a remote reminder message to the computer owner, or the like. For the information security hazard event EV3, after the user enters the office, if he or she leaves the computer 1000 at the lunch break or after work to make the computer enter the locking status, the computer 1000 can rapidly discover emerging threats. At the critical moment within 6 to 10 seconds, the computer 1000 responds instantly and performs screen protection, and the functions of the mouse, the keyboard and the screen (backlight) are correspondingly disabled, or the computer function is automatically blocked (e.g., the wake-up function of the power button is disabled) to disable malicious intruders from unlocking and booting to the main screen, and the risk of making data be stolen can be reduced.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An automatic protection method of a computer, comprising:
   receiving a sound signal by a sound receiving unit of the computer;
   determining whether a fan error event occurs according to the sound signal;
   performing a first data protection procedure if the fan error event occurs;
   determining whether a disaster event occurs according to the sound signal;
   performing a second data protection procedure if the disaster event occurs;
   determining whether the computer is at a locking status;
   determining whether an information security hazard event occurs according to the sound signal if the computer is at the locking status; and
   performing a third data protection procedure if the information security hazard event occurs.

2. The automatic protection method according to claim 1, wherein the step of determining whether the fan error event occurs comprises:
   measuring a wind shear volume of the sound signal;
   measuring a chip temperature of the computer;
   acquiring a predetermined volume range corresponding to the chip temperature according to a look-up table;
   determining whether the wind shear volume falls within the predetermined volume range; and
   confirming that the fan error event occurs if the wind shear volume does not fall within the predetermined volume range.

3. The automatic protection method according to claim 1, wherein the first data protection procedure is uploading data to a cloud, backing up data into a hard drive or outputting a reminder message.

4. The automatic protection method according to claim 1, wherein the step of determining whether the disaster event occurs comprises:
   determining whether the sound signal contains an alarm sound;
   determining whether the sound signal contains an alarm keyword; and
   confirming that the disaster event occurs if the sound signal contains the alarm sound or the alarm keyword.

5. The automatic protection method according to claim 1, wherein the second data protection procedure is uploading data to a cloud, backing up data into a hard drive or outputting a reminder message.

6. The automatic protection method according to claim 1, wherein the step of determining whether the information security hazard event occurs comprises:
   determining whether an authorized user is located nearby according to the sound signal;
   determining whether the sound signal contains a data steal keyword if the authorized user is not located nearby; and confirming that the information security hazard event occurs if the sound signal contains the data steal keyword.

7. The automatic protection method according to claim 1, wherein the third data protection procedure is shutting down the computer, disabling a function of an input/output apparatus, taking a photo, or sending a remote reminder message.

8. A computer, comprising:
a sound receiving unit for receiving a sound signal;
a fan;
a fan determination unit for determining whether a fan error event occurs according to the sound signal;
a disaster determination unit for determining whether a disaster event occurs according to the sound signal;
a status determination unit for determining whether the computer is at a locking status;
a data security determination unit for determining whether an information security hazard event occurs according to the sound signal if the computer is at the locking status; and
a processing unit, which performs a first data protection procedure if the fan error event occurs, performs a second data protection procedure if the disaster event occurs, and performs a third data protection procedure if the information security hazard event occurs.

9. The computer according to claim 8, wherein the fan determination unit comprises:
a volume measurement module for measuring a wind shear volume of the sound signal;
a temperature measurement module for measuring a chip temperature of the computer;
a data acquiring module for acquiring a predetermined volume range corresponding to the chip temperature according to a look-up table; and
a value determination module, which determines whether the wind shear volume falls within the predetermined volume range, and confirms that the fan error event occurs if the wind shear volume does not fall within the predetermined volume range.

10. The computer according to claim 8, wherein the disaster determination unit comprises:
a sound comparison module for determining whether the sound signal contains an alarm sound;
a word comparison module for determining whether the sound signal contains an alarm keyword; and
an information integration module for confirming that the disaster event occurs if the sound signal contains the alarm sound or the alarm keyword.

11. The computer according to claim 8, wherein the data security determination unit comprises:
a voiceprint comparison module for determining whether an authorized user is located nearby according to the sound signal;
a word comparison module for determining whether the sound signal contains a data steal keyword if the authorized user is not located nearby; and
an information integration module for confirming that the information security hazard event occurs if the sound signal contains the data steal keyword.

\* \* \* \* \*